United States Patent
Avril et al.

[11] Patent Number: 6,162,322
[45] Date of Patent: Dec. 19, 2000

[54] METHOD FOR FABRICATING ABRASIVE TOOLS

[75] Inventors: Nicolas Avril, Mérignac, France; Jane L. Cercena, Ashford, Conn.; Elinor B. Keil, Worcester, Mass.; David G. Lund, West Brookfield, Mass.; Karen M. Conley, Athol, Mass.; Bethany L. Salek, Worcester, Mass.

[73] Assignee: Norton Company, Worcester, Mass.

[21] Appl. No.: 09/272,883

[22] Filed: Mar. 19, 1999

Related U.S. Application Data

[62] Division of application No. 08/706,085, Aug. 30, 1996, Pat. No. 5,913,994.

[51] Int. Cl.⁷ .................................................. B29C 70/34
[52] U.S. Cl. .......................... 156/296; 156/166; 156/250
[58] Field of Search ..................................... 156/161, 296, 156/169, 173, 166, 172, 175, 250, 433, 441

[56] References Cited

U.S. PATENT DOCUMENTS

| | | |
|---|---|---|
| 3,116,986 | 1/1964 | Goepfert et al. . |
| 3,121,981 | 2/1964 | Hurst . |
| 3,146,560 | 9/1964 | Hurst . |
| 3,262,230 | 7/1966 | Seymour et al. . |
| 3,425,884 | 2/1969 | Brinkema ............................... 156/161 |
| 3,477,180 | 11/1969 | Robertson . |
| 3,772,126 | 11/1973 | Myers ................................... 156/441 X |
| 3,793,783 | 2/1974 | Paterno, Jr. et al. . |
| 3,838,543 | 10/1974 | Lakhani . |
| 4,021,209 | 5/1977 | Binkley . |
| 4,164,098 | 8/1979 | Akita . |
| 4,230,461 | 10/1980 | Sandman et al. . |
| 4,253,850 | 3/1981 | Rue et al. . |
| 4,259,089 | 3/1981 | Waizer et al. . |
| 4,338,357 | 7/1982 | Pichler et al. . |
| 4,350,497 | 9/1982 | Ogman . |
| 4,401,442 | 8/1983 | Oide . |
| 4,657,563 | 4/1987 | Licht et al. . |
| 4,715,150 | 12/1987 | Takeuchi et al. . |
| 4,800,685 | 1/1989 | Haynes, Jr. . |
| 4,989,375 | 2/1991 | Henmi et al. . |
| 5,015,540 | 5/1991 | Borom et al. . |
| 5,323,978 | 6/1994 | Watkins ............................... 156/447 X |
| 5,431,596 | 7/1995 | Akita et al. . |

FOREIGN PATENT DOCUMENTS

| | | |
|---|---|---|
| 2108094 | 4/1994 | Canada . |
| 2432364 | 2/1980 | France . |
| 1291648 | 12/1962 | Germany . |
| 1291648 | 3/1969 | Germany . |
| 1502655 | 6/1969 | Germany . |
| 3003666A1 | 1/1980 | Germany . |
| 3819199A1 | 6/1988 | Germany . |
| 19549078 | 7/1997 | Germany . |
| 2137220A | 10/1984 | United Kingdom . |

*Primary Examiner*—Jeff H. Aftergut
*Attorney, Agent, or Firm*—Mary E. Porter

[57] ABSTRACT

Methods for orienting fibers and an apparatus for orienting fibers are provided for the fabrication of improved thin abrasive wheels utilizing uniform non-woven fiber reinforcement discs. The wheels are more resistant to hub push-out failure during grinding than wheels reinforced with woven fiber cloth.

5 Claims, 10 Drawing Sheets

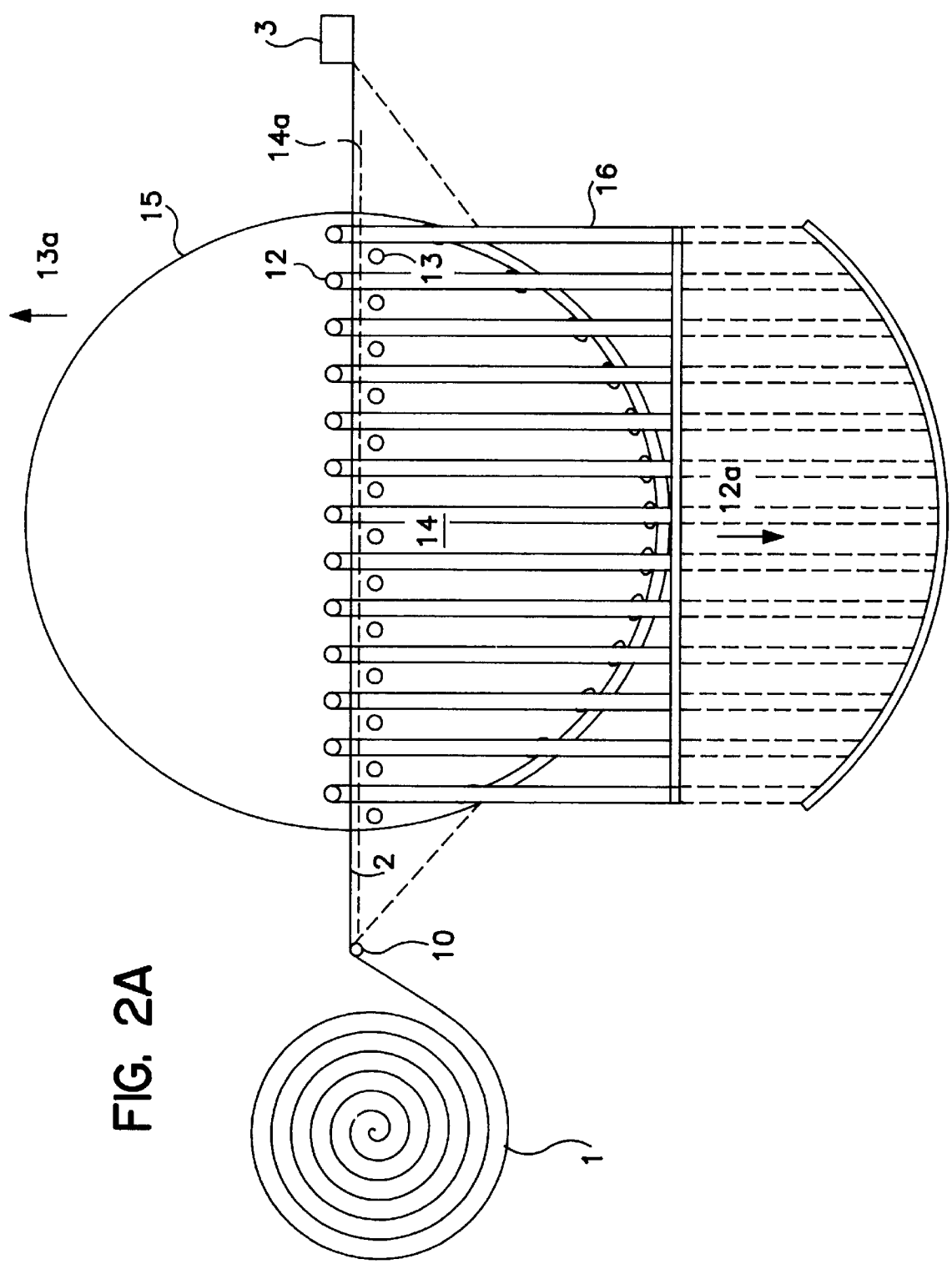

METHOD FOR FABRICATING ABRASIVE TOOLS

This is a divisional application based on U.S. Ser. No. 08/706,085, filed Aug. 30, 1996, now U.S. Pat. No. 5,913,994.

BACKGROUND OF THE INVENTION

Abrasive tools are reinforced with fibers to strengthen the tools and permit safe operation at high rotational speeds, especially in metal cut off, snagging and rough grinding operations. Abrasive tools designed for such operations are generally referred to as "thin abrasive wheels."

In the traditional manufacturing processes for such abrasive tools, woven fiberglass cloth discs are cut from cloth sheets and placed in molds for the wheel, below and on the top of a mix of abrasive grain and bond components. Wheels are then pressed in a mold and cured. Typical manufacturing processes for woven fiberglass cloth reinforcement are described in U.S. Pat. No. 4,800,685 to Haynes and U.S. Pat. No. 4,401,442 to Oide. Although these techniques yield uniform reinforcement across the diameter of the wheel, continuously covering the wheel from the central mounting hub to the wheel periphery, the manufacturing processes are characterized by high material waste (e.g., a minimum of 22%) and high labor costs.

In a non-traditional wheel design, partial reinforcement of a laminated composite wheel with woven fiberglass cloth has been suggested in U.S. Pat. No. 5,431,596 to Akita, et al. Higher wheel speeds have been achieved using woven rovings (non-twisted yarns) of fiberglass as disclosed in U.S. Pat. No. 3,838,543 to Lakhani. Woven fibers having higher strength and performance characteristics than fiberglass are used for reinforcement of wheels in U.S. Pat. No. 4,259,089 to Waizer and in US-A-4,021,209 to Binkley, and fiber coatings are used for improved wheels containing woven fibers in U.S. Pat. No. 4,338,357 to Pichler, et al.

The non-woven fiberglass reinforcement techniques known in the art do not produce uniform, effective patterns of reinforcement. For example, the curved, preferably spiral or spirographic, path of fiberglass reinforcement disclosed in CA-A-2,108,094 to Rector would produce a wheel having a tangential reinforcement incapable of resisting the stress of a side load. The wheel also has fiber strands parallel to the grinding face of the wheel which would cause a variety of problems (e.g., splaying) in grinding operations. Similar problems with non-uniform reinforcement, failure to meet burst speed specifications, and lack of sufficient reinforcement at the grinding face of the wheel would result from the "bicycle spoke" fiber design shown in DE-1,291,648 to Kistler, et al; and in the annular fiber pattern disclosed in U.S. Pat. No. 3,262,230 to Seymour, et al.

The use of short chopped fiber reinforcement as disclosed in, e.g., U.S. Pat. No. 4,989,375 to Henmi; U.S. Pat. No. 4,657,563 Licht, et al; U.S. Pat. No. 4,253,850 to Rue et al; GB-A-2,137,220 to Rands; and DE-A-1,502,655 to Ruggeberg, does not provide sufficient strength to reinforce thin abrasive wheels for more demanding high speed grinding operations.

Other non-woven fiber reinforcement techniques known in the art which could provide adequate wheel strength are not useful because they require complex operations with high labor or equipment costs. For example, a process for reinforcing wheels disclosed in U.S. Pat. No. 3,121,981 to Hurst requires the steps of: coating a fibrous sheet material containing abrasive grain with adhesive, placing parallel strands of reinforcing fibers on the tacky surface, coating the reinforcing fibers with a layer of an abrasive grain-organic bond mixture, drying and cutting the resulting laminate to the shape of the wheel, and stacking layers of the laminate with the reinforcing fibers oriented in different directions, and molding the stack to form a wheel. As disclosed in U.S. Pat. No. 4,164,098 to Akita, a floral design of long and short "petals" is used as an ancillary reinforcement near the hub of the wheel with woven fiberglass cloth reinforcement provided from the hub to the periphery of the wheel. These non-woven fiber processes employ excessive and costly steps to achieve wheel reinforcement.

SUMMARY OF THE INVENTION

It has now been discovered that methods of forming patterns of non-woven fibers on relatively inexpensive equipment may be used to yield uniformly reinforced thin abrasive wheels. Thin abrasive wheels, particularly raised hub wheels, reinforced with such uniform patterns of non-woven fibers have significantly improved resistance to hub push-out failure during grinding operations. An apparatus has been developed to efficiently manufacture these non-woven fiber arrays.

DESCRIPTION OF THE PREFERRED EMBODIMENTS

Figure 1A:
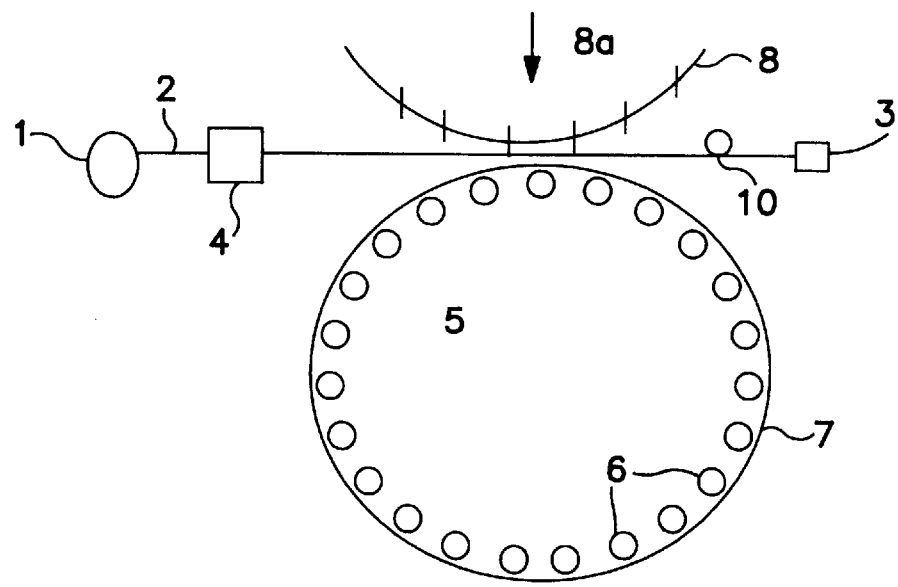
FIG. 1 is an illustration of a method of fabricating a non-woven fiber array in a zig-zag pattern from one or two spools of fiber using a rake and a rotating plate with set pins.
Figure 1B:
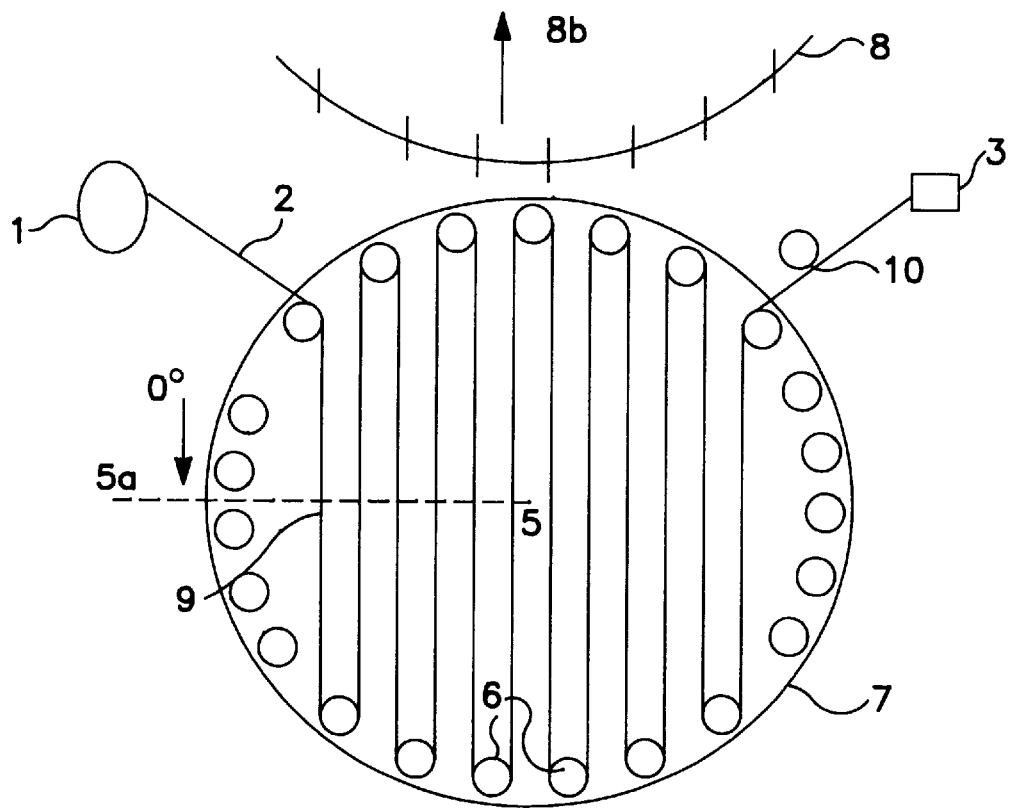
Figure 1C:
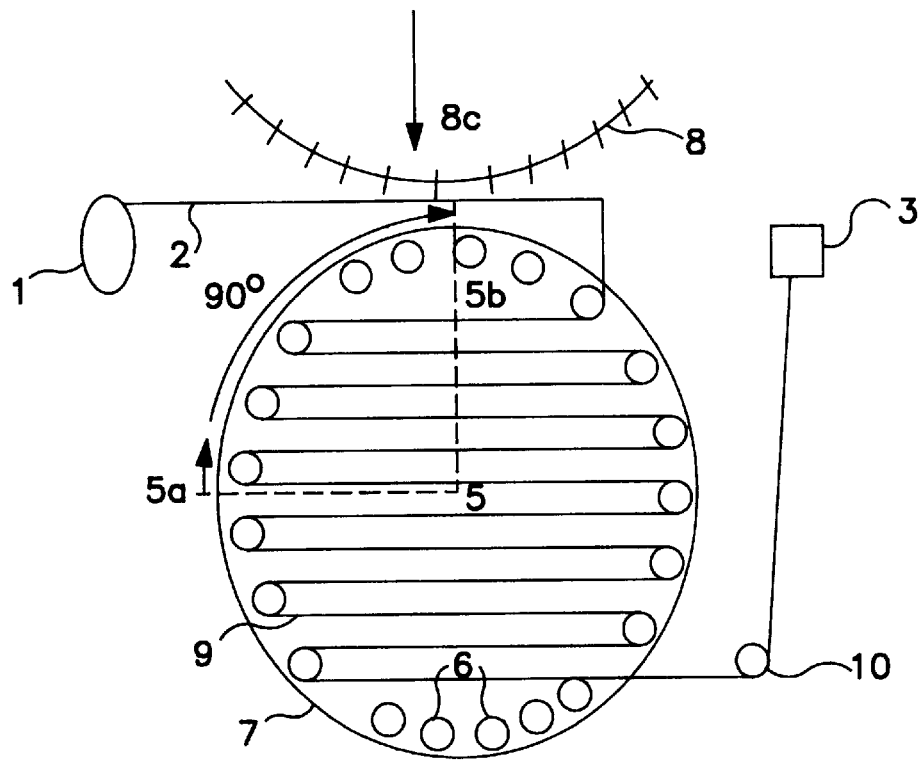
Figure 1D:
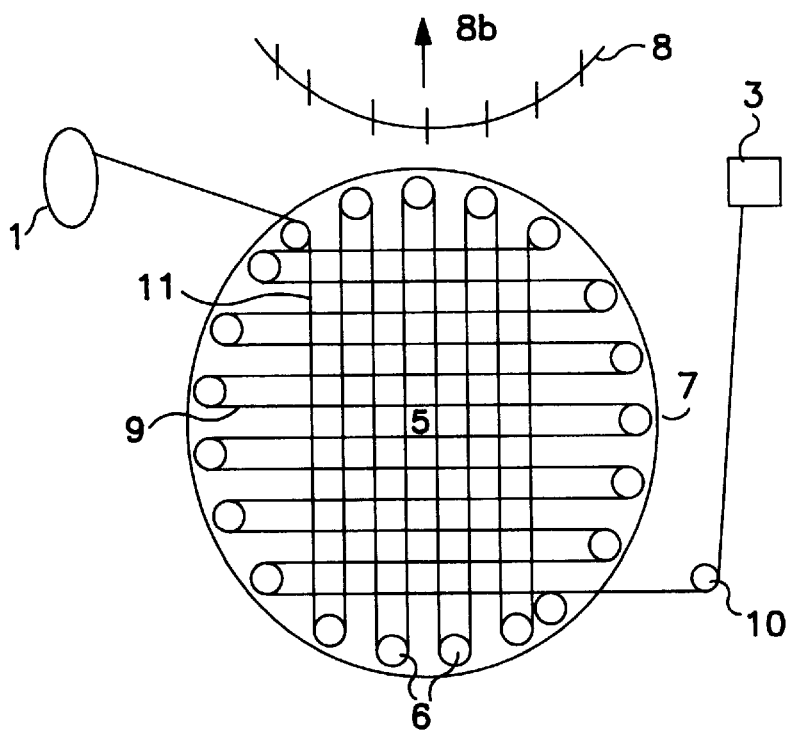

Any method and apparatus for orienting fibers may be used to fabricate the non-woven fiber reinforcements for thin abrasive wheels, provided that in accordance with the invention, the reinforcement has a uniform quantity of fiber in a uniform spacial arrangement from the wheel hub to the wheel perimeter. As used herein, the term "uniform" means a regular pattern of cells defined by the intersections of two or more fibers, e.g., the cross-hatch pattern of square cells defined by two parallel fiber arrays placed at 90 degrees to each other, which pattern mimics the appearance of woven cloth. To maximize wheel safety and grinding speed, the method and apparatus create reinforcements having substantially parallel fibers arrayed in a cross-hatch configuration with fiber intersect angles of about 45 to 135 degrees, preferably about 90 degrees.

The methods and apparatus are preferably selected for cost-effective, automated manufacturing with a minimum of fiber waste. Examples of suitable methods and an apparatus design are illustrated in FIGS. 1–6. In the zig-zag methods shown in FIGS. 1–3, only one or two supply spools of fiber must be maintained to carry out the fiber orientation. In the multiple discontinuous fiber method shown in FIG. 4, multiple supply spools are used to feed fiber into the process.

FIG. 1 illustrates the steps of a zig-zag method of arraying the fiber. As shown, a fiber spool 1 supplies fiber 2 which is attached at the leading end to an anchor 3. The fiber 2 may be passed through a heated resin bath 4 to coat the fiber with resin. The fiber 2 is oriented along a tangent to a circular rotatable platform 5 containing a plurality of set pins 6 located along the perimeter 7 of the rotatable platform 5. A curved rake 8 is positioned adjacent to the perimeter 7 of the rotatable platform and the fiber 2 passes between the rake 8 and the perimeter 7 in the initial step of the method as shown in FIG. 1A. The rake 8 is then moved in the direction 8a towards the rotatable platform 5, picking up the fiber 2, catching the fiber 2 on the portion of the set pins 6 nearest the rake 8 and carrying the fiber 2 across the rotatable platform 5 where either the rake 8 or the rotatable platform 5 is moved vertically such that the fiber 2 is hooked on the remaining set pins 6. As shown in FIG. 1B, the rake 8 is then retracted in the direction 8b to its original position, leaving a parallel zig-zag directional (0 degree) array of fiber 9. A resin spray or coating may be applied to coat the array of fiber 9, in lieu of, or in addition to, drawing the fiber through a heated resin bath. To complete the fiber orientation, the rotatable platform is turned, e.g., 90 degrees from its initial position 5a to a second position 5b, as shown in FIGS. 1B and 1C, and the rake 8 is again passed over the fiber 2 through a portion of the stationary pins 6 over the rotatable platform 5 and above the remaining set pins 6 to hook the fiber 2 and create a parallel zig-zag directional (e.g., 90 degrees) fiber array 11, as shown in FIG. 1D. The fiber arrays are then bonded together, e.g., by heat, optionally with a spray of resin to coat the fiber arrays 9 and 11, and optionally with pressure. If desired for reinforcement, additional fiber arrays may be created and bonded together with the initial fiber arrays 9 and 10. The resultant non-woven cross-hatch fiber reinforcement disc is removed from the set pins 6 and the rotatable platform 5 by a mechanical means (e.g., blowing with air, lifting with fingers or vacuum, inversion, etc.) and used as reinforcement in a thin abrasive wheel.

FIG. 2 illustrates two alternate methods for creating fiber reinforcement discs using zig-zag arrays of fiber and moveable pins over a support disc 14 which may or may not rotate, as desired for the apparatus selected to carry out the method. In one embodiment of this method, a first set of moveable pins 12 are aligned in a row across the diameter of the support disc 14 at or near the center point 14a of the support disc 14. A second set of moveable pins 13 are aligned in a row across the diameter of the support disc at or near the center point 14a and parallel to the first set of moveable pins 12. Each of the moveable pins 12 is attached to an arm 16 capable of movement in the directions indicated as 12a. Similar arms (not shown) capable of movement in the opposite direction indicated as 13a are attached to each of the moveable pins 13. The fiber 2 is drawn between the two rows of moveable pins 12 and 13 from a supply spool 1 with the leading end secured in an anchor 3.

As shown in FIG. 2A, the arms 16 may be used to move the pins 12 towards the fiber 2, hooking the fiber and pulling the fiber 2 in a semi-circle towards the perimeter 15 of the support disc 14. Simultaneously the moveable pins 13 are moved across the fiber 2 in a direction 180 degrees from the direction of the moveable pins 12, hooking the fiber and pulling the fiber 2 in a semi-circle towards the perimeter 15 of the support disc 14. The perimeter 15 positions of the fiber 2, pins 12 and arms 16 are shown in broken lines in FIG. 2A. One or more tensioning devices 10 may be used to adjust fiber tension during this step. In addition, moveable pins 12 and 13 may be operated sequentially to minimize tension while pulling the fibers. At the perimeter 15, the fiber 2 is released from the moveable pins 12 and 13. Depending upon the apparatus selected to carry out this method, a second set of pins may be used to orient a second fiber array and these process steps are repeated. In the alternative, using the same set of pins, either the moveable pins 12 and 13 or the support disc 14 bearing the first zig-zag parallel directional (0 degree) fiber array is rotated 45 to 135 degrees, preferably 90 degrees, from the initial configuration, and the fiber drawing and pulling steps are repeated to create one or more additional zig-zag parallel directional (e.g., 90 degrees) fiber arrays on top of the first fiber array. The resulting non-woven cross-hatch fiber array is then processed as described above for the method shown in FIG. 1 and used to make thin abrasive wheels.

In a second embodiment of this method, using a different type of apparatus, the starting position and direction of movement of the rows of moveable pins 12 are switched with those of the rows of moveable pins 13 and the fiber 2 is pushed towards the perimeter 15 by the rows of pins 12 and 13 moving in opposite directions, rather than being pulled towards the perimeter 15 as illustrated in FIG. 2A.

Figure 2B:
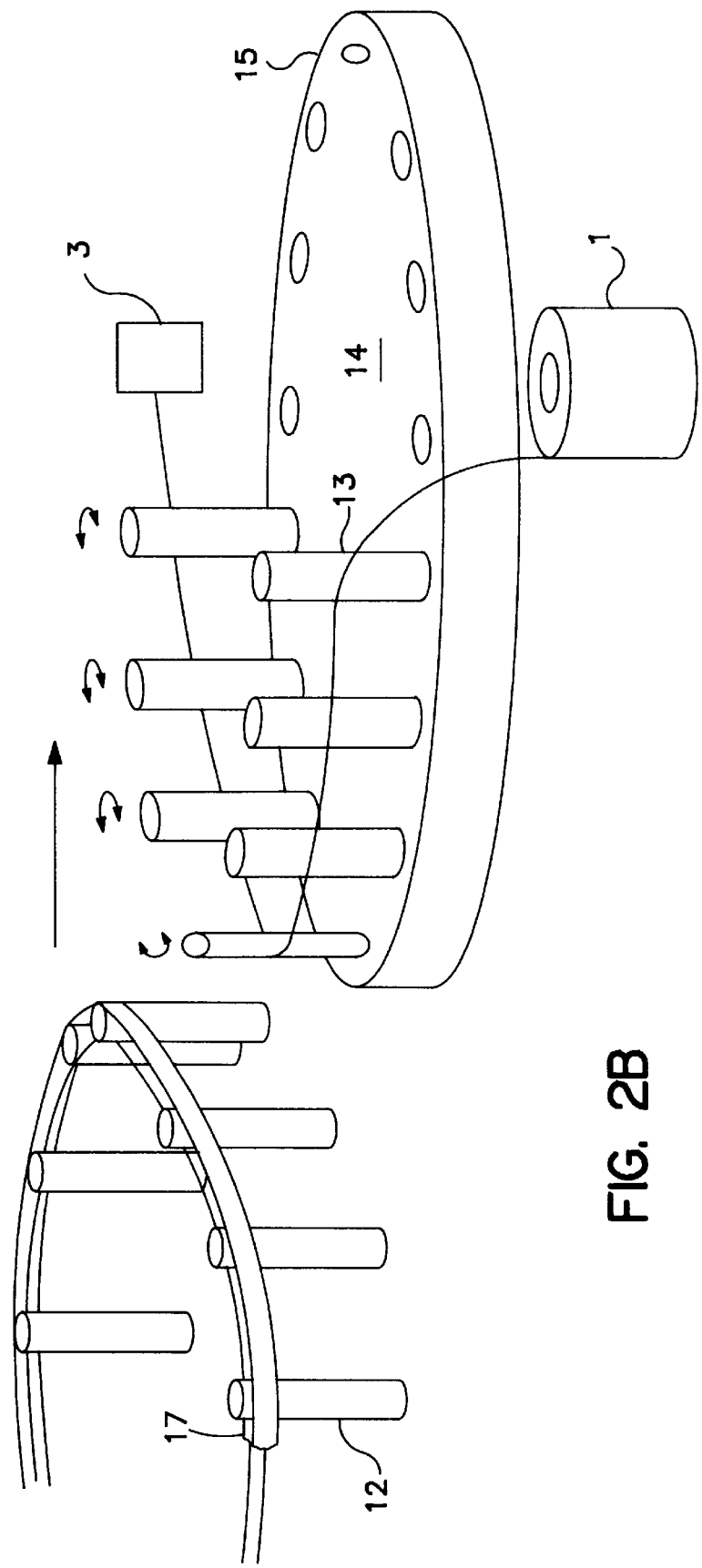
FIG. 2 is an illustration of a second method of fabricating a non-woven fiber array in a zig-zag pattern from one or two spools of fiber using movable pins on a circular platform.
Figure 2C:
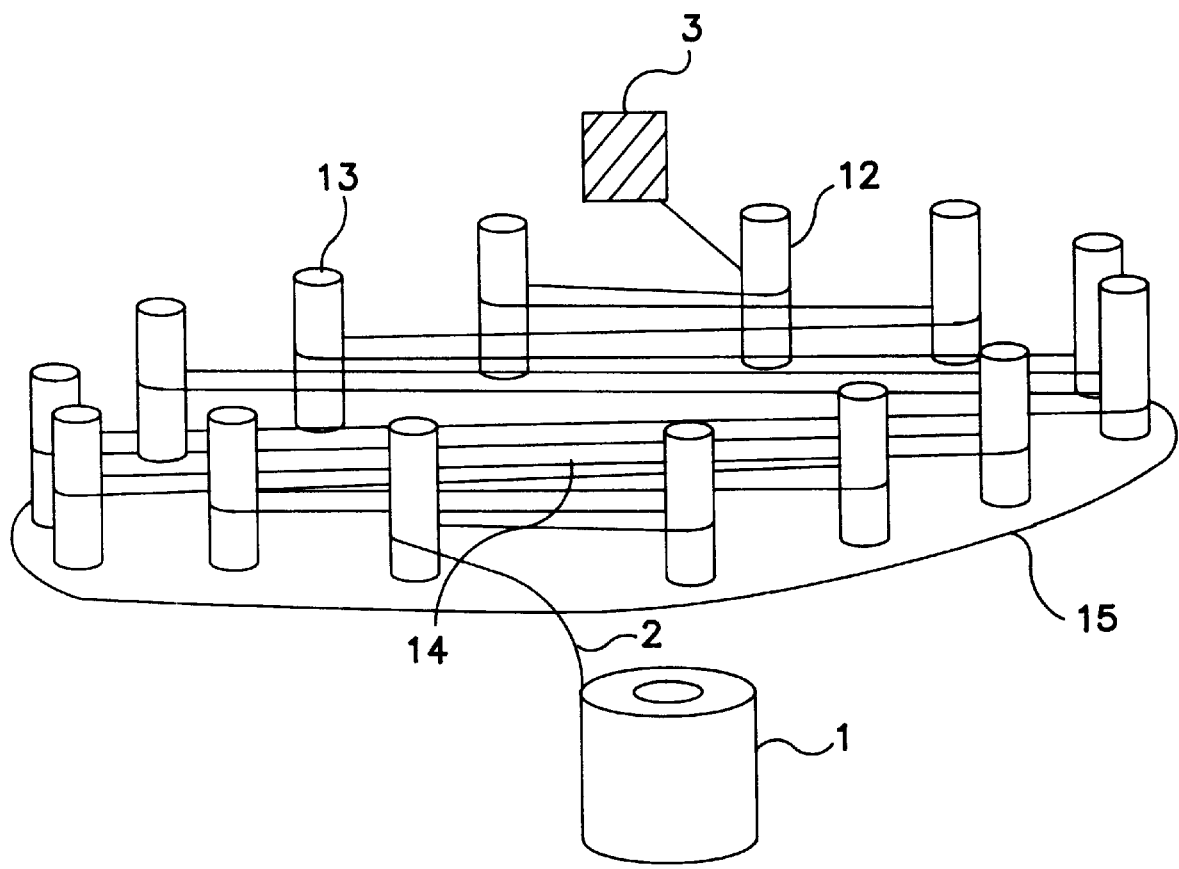

In the second method illustrated in FIG. 2, the non-woven fiber disc is made as shown in FIGS. 2B and 2C. A first set of moveable pins 12 arranged in a semi-circle is connected to a moveable arm 17 initially situated at the perimeter 15 of the support disc 14. A fiber 2 from a supply spool 1 is drawn across a second set of moveable pins 13 set in a semi-circle along the perimeter 15 of the support disc 14 and the leading edge of the fiber is attached to an anchor 3. The moveable arm 17 is moved toward the fiber 2 and across the fiber 2, moveable pins 13 and support disc 14 to the perimeter 15, pulling the fiber 2 into a first zig-zag parallel directional (0 degree) fiber array as shown in FIG. 2C. The moveable arm 17 is then retracted. Depending upon the apparatus used to carry out the method, an alternate set of pins may be used for the next step, or either the support disc 14 bearing the first fiber array is rotated, or the moveable pins 12 and 13 together with the moveable arm 17 are rotated from about 45 to 135 degrees, preferably 90 degrees. The fiber pulling step is repeated to form one or more additional zig-zag parallel directional (e.g., 90 degrees) fiber arrays, and the fiber arrays are finished as described above, thereby creating a non-woven cross-hatch fiber reinforcement disc suitable for use in making thin abrasive wheels.

Figure 3:
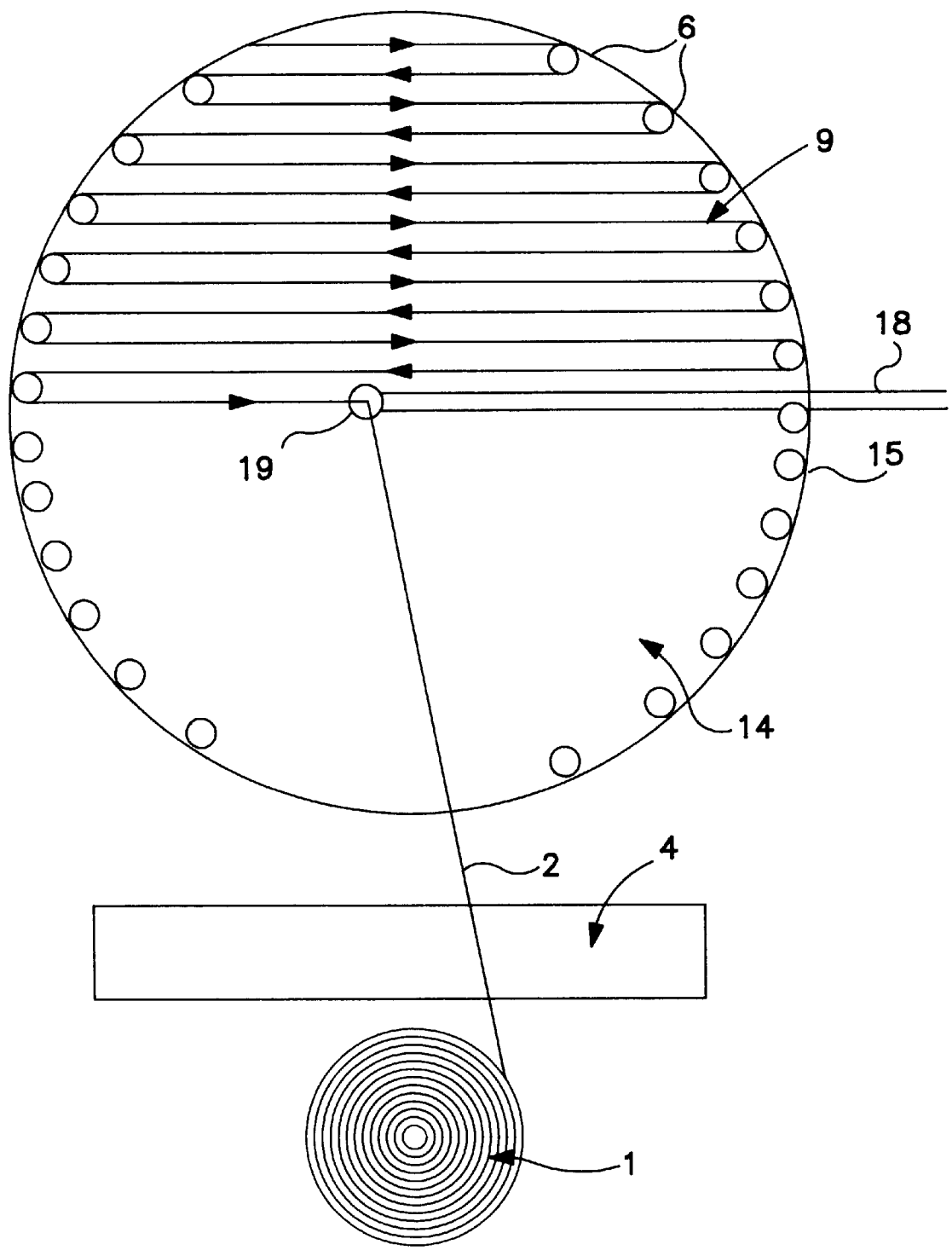
FIG. 3 is an illustration of a method useful for making a zig-zag pattern of non-woven fibers from one or two spools of fiber using a shuttle arm on a plate with set pins.

FIG. 3 illustrates a third zig-zag method for creating a uniform non-woven fiber reinforcement disc for thin abrasive wheels. In this method, a shuttle arm 18 guides a fiber 2 threaded through a needle 19 in a zig-zag pattern across a support disc 14, hooking the fiber 2 around each of a plurality of set pins 6 located at the perimeter 15 of the support disc 14 to create a first zig-zag parallel directional (0 degree) fiber array. In lieu of the set pins 6, an apparatus equipped with a tracking device for the shuttle arm 18 movement may be employed to define the limits of the periphery of the zig-zag fiber array.

The support disc 14 may be part of a conveyor belt in a manufacturing line, a rotatable platform, the bottom of an abrasive wheel mold or a variety of alternate structures adapted to have approximately the same size and shape as the abrasive wheel for which the reinforcement disc is intended. Depending upon the apparatus used, either the assembly comprising the shuttle arm 18, needle 19 and fiber 2 is rotated from about 45 to 135 degrees, preferably 90 degrees, with respect to the first zig-zag fiber array, or the support disc 14 is rotated the targeted distance, to permit one or more additional zig-zag fiber arrays to be constructed and bonded to create the final cross-hatch non-woven fiber reinforcement disc.

The methods illustrated in FIGS. 1–3 are examples only and are not intended to limit the scope of the invention. The method of the invention may be carried out in other ways, provided the method utilizes no more than one fiber supply source for each type of fiber placed in the zig-zag fiber array, creates a non-woven pattern characterized by bi-directional strength and resistance to lateral stresses when bonded into an abrasive wheel, and provides uniform fiber quantity and fiber spacing from the center to the perimeter of the fiber reinforcement disc produced by the method. Likewise, various equipment may be selected by one skilled in the art and used to produce the non- woven fiber reinforcement discs and to manufacture thin abrasive wheels comprising the reinforcement discs.

While FIGS. 1–3 generally illustrate the creation of a fiber array as a full circle, it is contemplated that a fiber array may be oriented over less than the full circle, e.g., over one-quarter of a circle or one-third of a circle, circumscribed by the support platform, and then the workpiece may be turned, e.g., 45 degrees, and subsequent portions of the fiber may be oriented over a portion of the first array. In this manner, no fiber is placed over the center hole of the reinforcement disc and an abrasive wheel may be made without cutting out a center hole so the wheel can be mounted on a grinding machine.

In carrying out the zig-zag fiber orientation method it is preferred to bond the fiber arrays together. However, a single zig-zag fiber array could be used as an individual piece upon which is stacked one or more additional fiber arrays arranged in a cross-hatch pattern and contained, e.g., in an abrasive wheel mold, to form the reinforcement disc. This could be carried out by conveying an abrasive wheel mold on a belt past a first and a second fiber orientation station where a first and a second fiber array are placed in the mold. As the mold on the belt moves down the line, a mix of abrasive grain and bond could be placed on top of the fiber arrays, followed by a third and a fourth fiber array placement in the mold.

In making a preferred bonded non-woven fiber reinforcement disc, a resin is preferably sprayed or otherwise coated on the semi-finished fiber arrays. Uncoated fiber may be freely drawn and pulled into an array without the tackiness of the resin interfering with fiber movement and creating sufficient tension to break the fibers during processing. However, on equipment adapted with appropriate tensioning devices and timing mechanisms, a resin bath may be used to coat the fibers with resin prior to creating the fiber arrays. For either coating method, the resin may be heated to liquefy a solid resin or lower the viscosity of a liquid resin, or the resin may be solvated or thinned with a solvent or diluent which is subsequently evaporated to permit adequate coating of the fiber. Resins which are essentially solid at room temperature are preferred for subsequent handling of the reinforcement discs. A resin coating on the fiber is preferred as a means to avoid fiber damage during handling, improve bonding of the reinforcement disc to the components of the abrasive wheels, and to fix the fiber orientation while manufacturing the abrasive wheels.

FIG. 4 illustrates a multiple discontinuous fiber method for creating a uniform non-woven fiber reinforcement disc for thin abrasive wheels. As shown in FIG. 4A, each of a plurality of fibers 2 held in a parallel direction by a fiber array clamp 21 are individually gripped by a plurality of fiber guides 20. The fibers 2 are drawn from a plurality of fiber supply spools 1 and may be passed through a heated resin bath 4 to coat the fibers with resin. Unlike the zig-zag fiber method, in the multiple discontinuous fiber method a resin bath is preferred over subsequent spraying or coating steps because fiber tension is much more uniform and easier to control, and the fiber pre-coating step is more efficient.

Figure 4A:
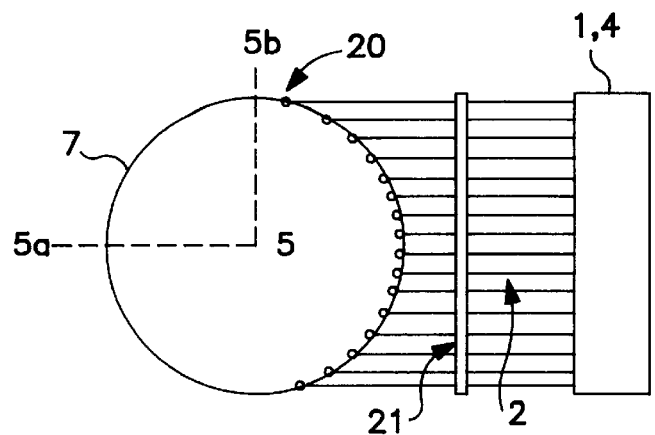
FIG. 4 is an illustration of a method of fabricating a non-woven fiber array into a cross hatch pattern from multiple fiber spools linked to moveable fiber guides.
Figure 4B:
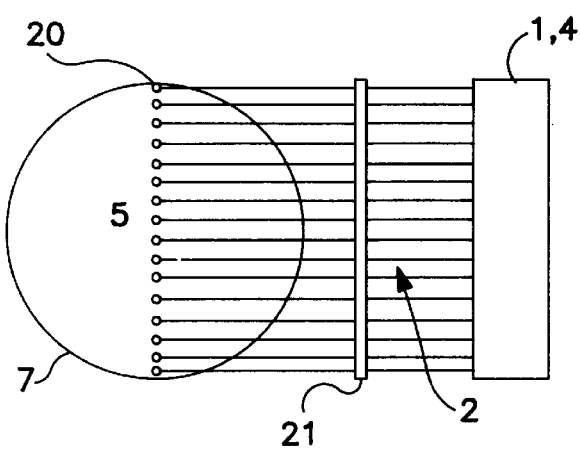
Figure 4C:
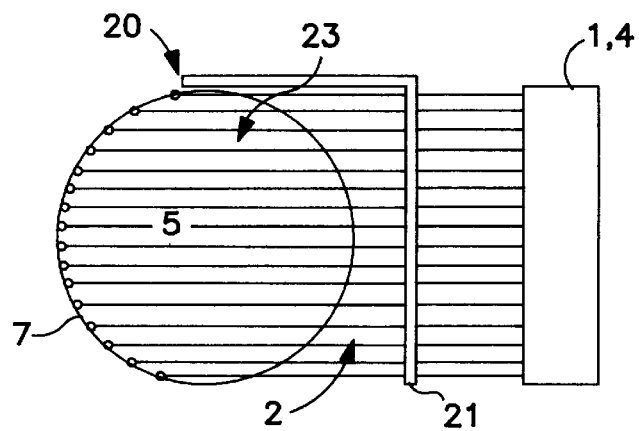
Figure 4D:
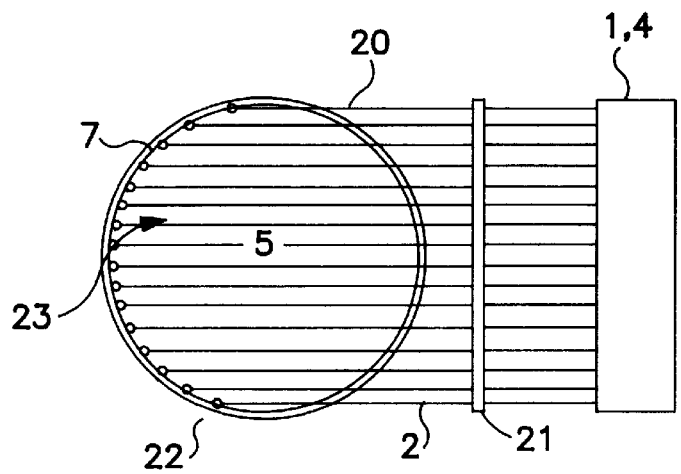
Figure 4E:
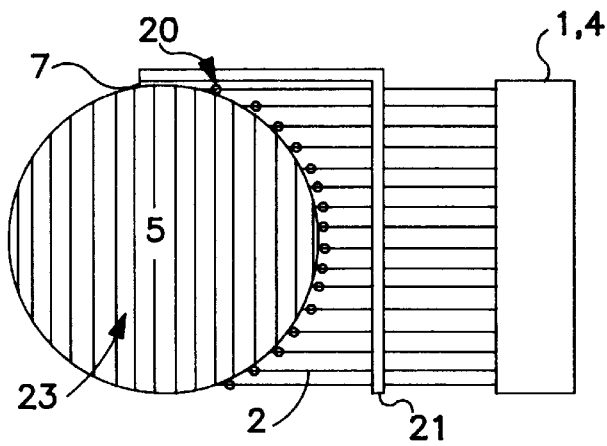
Figure 4F:
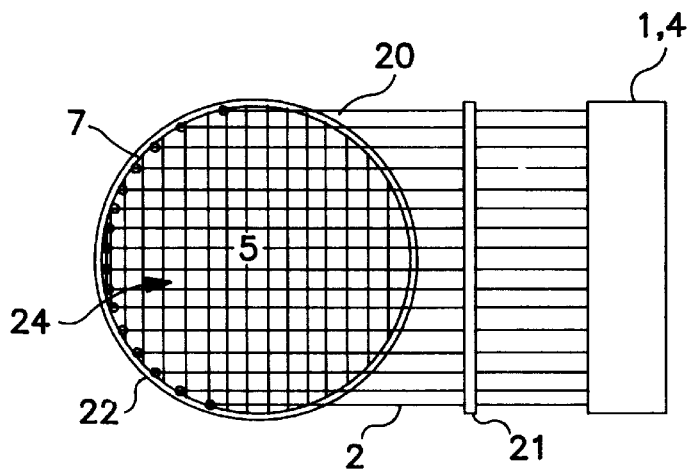

The fiber guides 20 are initially set in a semi-circle at the perimeter 7 of a rotatable platform 5, as shown in FIG. 4A, but are capable of shuttling back and forth in parallel tracks (not shown) over the rotatable platform 5 from points on the initial half of the perimeter 7 to points on the opposite half of the perimeter 7. The movements of the individual fiber guides 20 to a half-way point in the center of the rotatable platform 5, and then to the opposite half of the perimeter 7 are depicted in FIGS. 4B and 4C. A semi-circular portion of a circular knife blade 22 cuts the fibers 2 at the initial half of the perimeter 7 as shown in FIG. 4D, and the fiber guides 20 are retracted to the initial half of the perimeter 7 where new fibers 2 are fed into the fiber guides 20 by means of a cam (not shown). At this stage, on the rotatable platform 5, there is a parallel directional (0 degree) array of discontinuous fibers 23 having approximately the same size and shape as the thin abrasive wheel which is to be reinforced. The array of discontinuous fibers 23 is rotated as shown in FIG. 4E from about 45 to 135 degrees, preferably 90 degrees, from an initial position of 0 degree. The process of drawing a plurality of fibers 2 with the fiber guides 20 and cutting the fibers 2 is repeated to complete a cross-hatch pattern of discontinuous fiber arrays 24. The non-woven cross-hatch fiber pattern is further processed as described above for the zig-zag fiber method to yield a non-woven fiber reinforcement disc for use in making thin abrasive wheels.

One of the benefits of the multiple discontinuous fiber method is that a variety of types of fiber may be used within the reinforcement disc. For example, glass and carbon fibers may be used together, or a mixture of glass rovings and glass yarns may be used. The quantity of fiber used may be reduced to one-half by simply eliminating every other fiber supply spool from the process.

Figure 5:
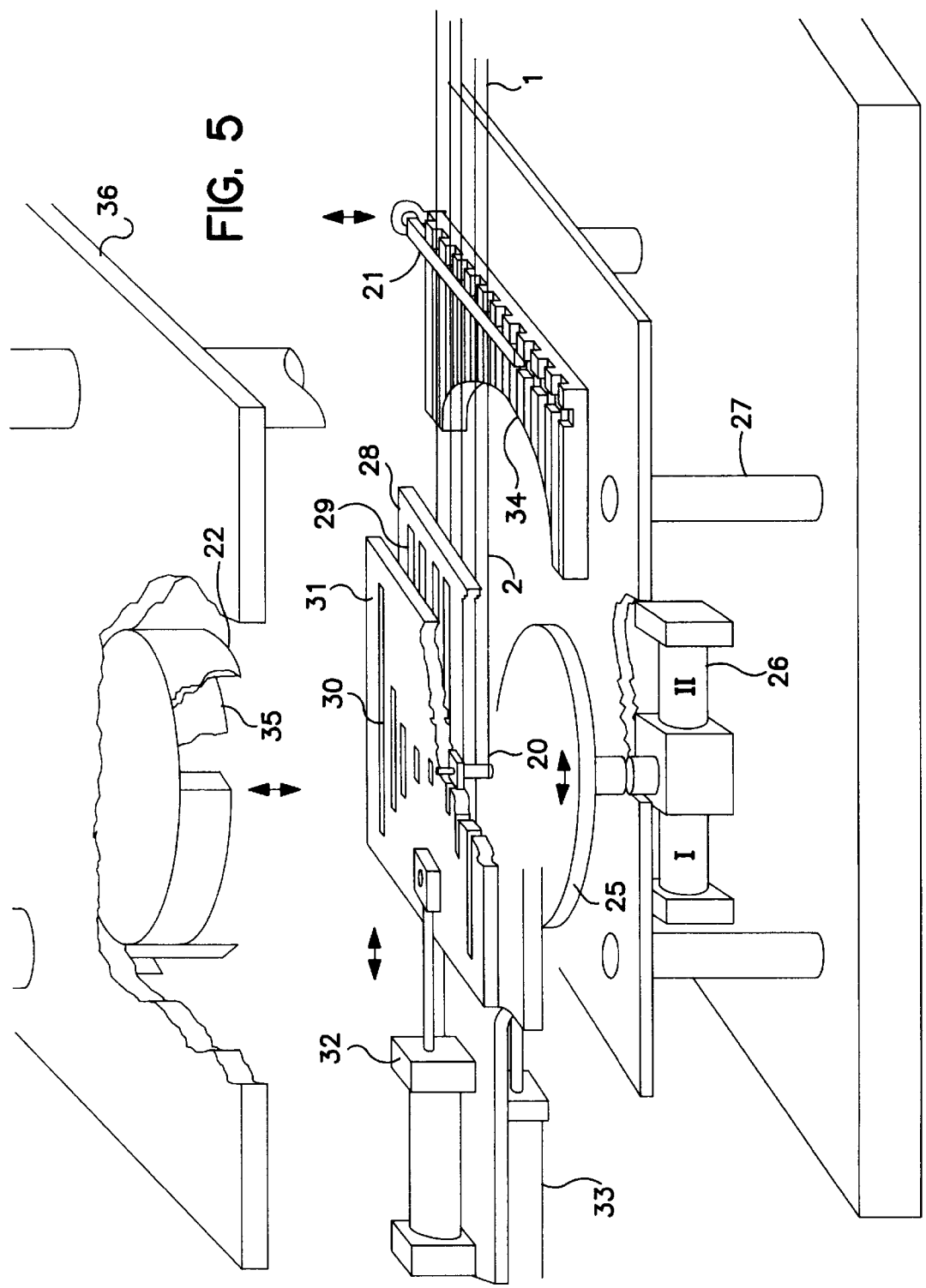
FIGS. 5–6 are illustrations of an apparatus useful for fabricating a cross-hatch pattern of non-woven fibers from multiple fiber spools linked to moveable fiber guides.

FIG. 5 illustrates an apparatus useful for carrying out the method shown in FIG. 4. The apparatus comprises a rotatable platform 25 mounted on a means for rotation 26 and a stationary means for support 27, with a bottom plate 28 containing a series of bottom parallel grooves 29 and a top plate 30 with a synchronized series of top parallel grooves 31 mounted on moveable support arms 32 for the top plate and 33 for the bottom plate and positioned a defined distance above the plane of the rotatable platform 25.

In operation, the movement of the support arm 32 for the top plate 30 causes each fiber guide 20 which is engaged in one of the slots 31 in the top plate 30 to move, and each slot 31 length defines the distance of travel for the corresponding engaged fiber guide 20. The distance of travel of the fiber guide 20 determines the length of fiber 2 deposited on the platform 25. Each fiber guide 20 is also engaged in one of the slots 29 in the bottom plate 28 and the slots 29 maintain the fibers 2 in a parallel array during the operation.

Figure 6:
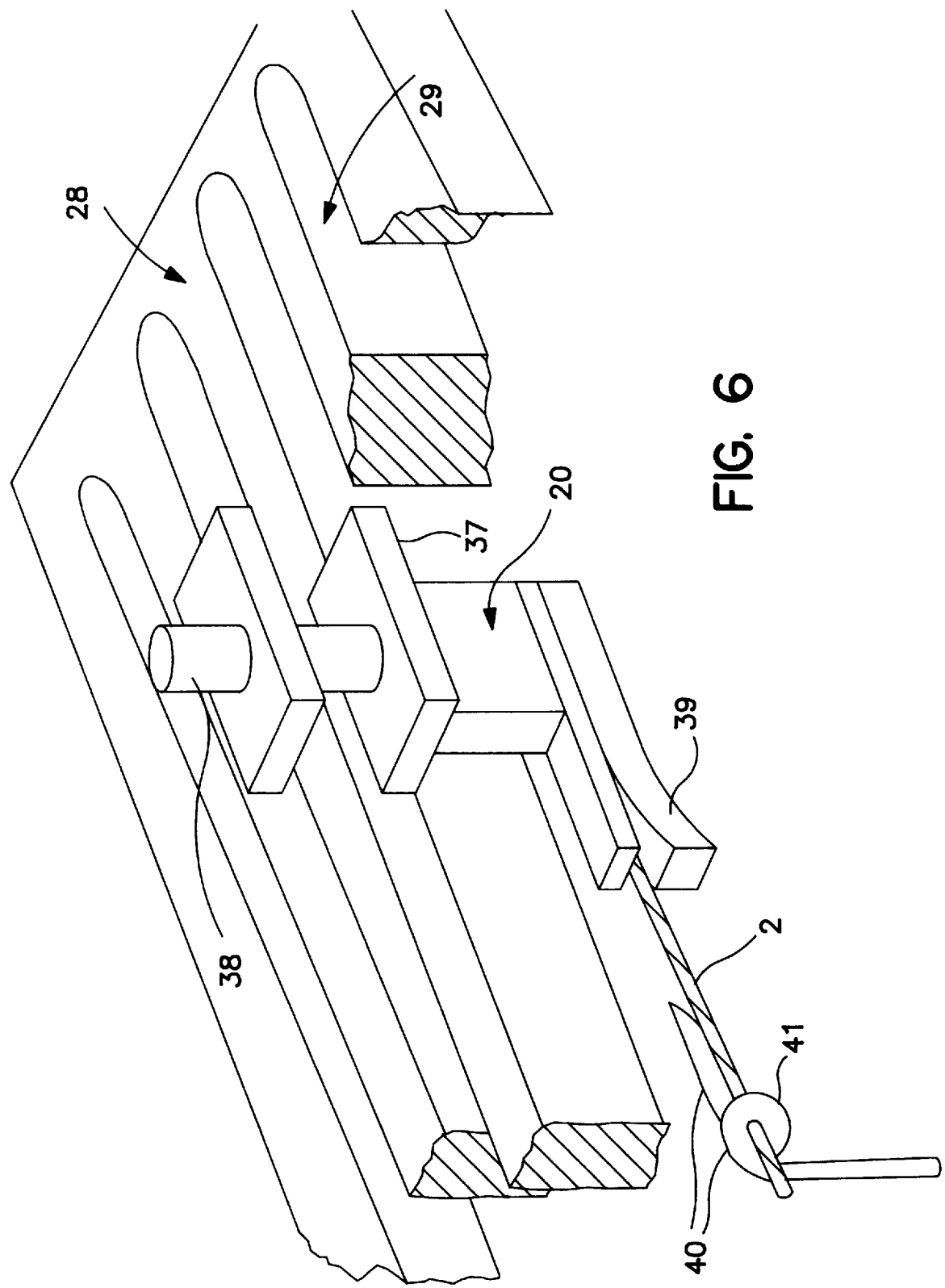

The fiber guides 20 of the apparatus of FIG. 5 are illustrated in further detail in FIG. 6. A nut 37 secures the fiber guide 20 against the bottom plate 27 such that the fiber guide 20 moves in a track defined by the engaged slot 29 in the bottom plate 28. The head 38 of the fiber guide moves in a track defined by the engaged slot 31 in the top plate 30 (not shown) to position the fiber 2 being gripped in the spring steel jaws 39 of the fiber guide 20. The fiber 2 is placed in the jaws 39 by a cam 40. When the cam 40 is moved forward, it opens the jaws 39 and releases into the jaws 39 the end of a fiber 2 which has been carried forward in the hook 41 connected to the cam 40. The movements of these components are synchronized so the apparatus illustrated in FIGS. 5 and 6 may be operated automatically and continuously.

As shown in FIG. 5, a circular cutting knife 22 and a press plate 35 are mounted on a moveable support structure 36 overhead the rotatable platform 25. The cutting knife 22 and the press plate 35 may be moved vertically to cut the fibers 2 after a discontinuous fiber array has been formed and to press, optionally with the application of heat, the cross-hatch fiber arrays to bond the reinforcement disc. The support structure 36 optionally is equipped with linear or circular moveable clamps (not shown) for holding the fiber in position during cutting steps, additional drawing steps, fiber guide retraction steps, bonding steps, disc removal steps, and the like. The motion of the cutting knife 22, the press plate 35 and the support structure 36 is synchronized with the motion of the rotatable platform 25, fiber guides 20, cams 40 and other components of the apparatus to allow automatic and continuous operation.

In a preferred embodiment, the pneumatic operation of rotary actuators, pistons and other moving parts is used throughout the apparatus to permit precision operation. In the alternative, electric motors engaged with various drive mechanisms may be used on the apparatus. The process is preferably operated by one or more computerized process controllers.

Other components may be added to the apparatus illustrated in FIGS. 5 and 6 as desired for a given manufacturing facility or a given abrasive wheel. For example, in reinforcing 17.8 cm (7 inch) or 22.9 cm (9 inch) grinding wheels, a circular clamp to hold the discontinuous fiber array in place during future processing is usually not needed, but it may be desirable for larger diameter wheels. Retractable teeth or grooves on a rotatable platform capable of vertical movement may be added to hold the fiber array in position for certain steps and then to retract them when not needed.

Various shapes and designs of the components of the apparatus may be selected. For example the bottom plate 28 and top plates are shown as rectangles, but could be circular or have a different shape and size to facilitate modifications to the apparatus. It is intended that the apparatus be adaptable to make different sizes of discs for a variety of wheels. Thus, in a preferred embodiment, the apparatus may be fitted with interchangeable parts and is designed to accommodate the demands of the largest and smallest discs needed for wheel reinforcement. For equipment longevity, the apparatus is preferably constructed of durable metals, such as stainless steel, although other materials may be used where equipment construction, cost, repair or use makes durable metals undesirable.

Fibers useful herein include, but are not limited to, fiber glass, fibers of carbon, boron, aramid, polyacrylonitrile, high density polyethylene, and the like, fibers of ceramics, such as silicon carbide and alumina, and combinations thereof. A co-mingled roving of fibers of glass and fibers of organic polymer has been found suitable for use herein. Single or untwisted strands of fibers (rovings) or multiple, twisted strands of fibers (yarns) and combinations of the two may be used. In a preferred embodiment, fiberglass rovings are used. Suitable fiberglass materials may be obtained from Certain-Teed Corporation, Owens-Corning Fiberglass, PPG Corporation, or other suppliers. Although a resin coating on the fiber is not essential, it is preferred, especially for fiber glass.

Resins useful herein include, but are not limited to, phenolic materials of various grades and descriptions, including resoles and/or novolaks, with or without cross-linking agents; epoxy resins; acetate resins; urea resins; polyethylene; and combinations and derivatives thereof. Suitable resins are thermoplastic resins, such that the resin can tack fibers together at fiber intersections for positioning during reinforcement disc fabrication and then bond the reinforcement discs together for handling as the abrasive wheels are manufactured. Suitable resins tolerate temperatures of up to about 180° C. without degradation and retain functionality following hot pressing processes typically used to make the reinforced abrasive wheels. A coating of about 10 to 60, preferably 25 to 45, weight % resin on a fiber weight basis is preferred.

The non-woven fiber reinforcement discs of the invention may be used to strengthen a variety of wheel sizes and shapes. Depending upon the reinforcement strength requirements of the wheel, the cells of open space defined by the fiber intersections in the reinforcement discs preferably range in size from about 0.1 mm to 10 mm, most preferably from about 1 mm to 5 mm, in size. The discs are most useful in reinforcing thin abrasive wheels for rough grinding, snagging operations, cut-off operations and other very high speed grinding operations requiring high metal removal rates. Typical wheels of this class are described in U.S. Pat. No. 4,253,850, U.S. Pat. No. 4,338,357, U.S. Pat. No. 4,230,461, U.S. Pat. No. 4,657,563 and U.S. Pat. No. 4,800,685, the contents of which are hereby incorporated by reference. These wheels typically comprise one or more kinds of abrasive grain (about 24–60 volume %), such as fused aluminum oxide, fused alumina zirconia, sintered alumina-zirconia, sintered alumina (by sol gel or seeded sol gel processes), sintered bauxite and silicon carbide; organic or resinous bond, typically phenolic or epoxy resin bond (about 30–70 volume %); and various fillers, spacer materials and processing additives such as cryolite, kyanite, silicon carbide, sulfides, sulfates, halides, chlorides, fluorides and mixtures thereof.

In assembling the reinforced wheel, one non-woven fiber reinforcement disc is placed at the bottom of the mold, a mixture of the grain, bond and other wheel components is added to the mold, a second non-woven fiber reinforcement disc is layered on the top, planar surface within the mold, the mold is sealed, pressed, optionally with the application of heat, cured with a heating process at about 130–200° C., and the finished wheel is removed from the mold. Variations of this basic process may be carried out by one skilled in the art to make different types of wheels, comprising different quantities of reinforcement in selected zones of the wheels.

The wheels reinforced with the non-woven fiber arrays of the invention are stronger than equivalent wheels reinforced with an equivalent amount of woven fiber cloth. While not wishing to be bound by any theory, it is believed that the woven configuration of the fiber cloth creates stresses at the intersections of the fibers, aggravated by handling of the cloth during manufacturing, which stresses are absent from a non-woven fiber array. These stresses weaken the fibers and failure of the fiber reinforcement occurs at a lower load, especially under sideload conditions.

EXAMPLE 1

This example illustrates the preparation of thin abrasive wheels reinforced by the method of the invention and demonstrates the improved resistance of the wheels to hub failure from lateral stress forces.

Reinforcement discs having 90 degrees cross-hatch pattern of discontinuous fiber arrays were made manually from fiber glass rovings obtained from Style 184 materials supplied by Industrial Polymers and Chemicals. Orientation of the fibers into a reinforcement disc was done by hand essentially as described for the method shown in FIG. 4.

For the control wheel, reinforcement discs were cut from woven fiber glass cloth (Style 184 cloth obtained from Industrial Polymers and Chemicals).

Abrasive wheels (Type 1, flat, 7 inch (17.78 cm) in diameter by 1/8 inch (0.32 cm) thick) were made from 72.9 wt % brown alumina grain (36 grit) (Washington Mills) abrasive grain, 27.1 wt % of a mixture of organic bond (novolak resin) (Oxychem) and fillers (potassium sulfate and ferrous sulfide). A reinforcement disc was layered into a 7 1/8 inch (18.1 cm) wheel mold, the abrasive grain and bond were mixed and added to the mold and another reinforcement disc was placed on top of the mix. These components were pressed at 5 tons/square inch (703.1 Kg/sq. cm) for 10 seconds at room temperature, then cured at temperatures up to 200° C. The wheels were removed from the molds and tested for surface speed failure, using A.N.S.I. testing specifications; for maximum center load from lateral force stress (a ring on ring strength test at 0.05 inches/minute loading rate on a universal testing machine, with the load applied to the wheel flange from zero load to catastrophic wheel failure); for G-ratio (metal removal rate/wheel wear rate) measured on a carbon steel pipe workpiece, with 12 Kg load on the grinding spindle; and for power drawn during grinding.

| Wheel Style | Failure Speed Surface m/s | Failure Load Center kN | G-Ratio | Power Draw kW |
| --- | --- | --- | --- | --- |
| woven control | 150 | 2.7 | 1.6 | 3.0 |
| non-woven invention | 148 | 3.6 | 1.4 | 3.2 |
| Ave. error | ±4 | ±0.2 | ±10% | ±5% |

The results, as shown in the table above, demonstrate essentially equal grinding performance for woven and non-woven fiber reinforcement, with a significant increase (about 25%) in resistance to center push out wheel failure. Thus, the use of the non-woven fiber reinforcement discs of the invention in thin abrasive wheels yielded a stronger wheel than obtained with woven fiber reinforcement.

We claim:

1. A method for reinforcing a thin abrasive wheel with a non-woven fiber reinforcement disc, comprising the steps:

a) drawing a first set of parallel fibers gripped by a plurality of support means across a support platform having a circular perimeter to create a first array of discontinuous fibers in parallel positions having a circular periphery, each fiber being drawn a sufficient distance to intersect an initial point and a terminal point along the circular perimeter of the support platform;

b) cutting the fibers at the points of intersection along the circular perimeter of the support platform while maintaining the parallel positions of the first array of discontinuous fibers;

c) drawing a second set of parallel fibers gripped by a plurality of support means in a direction approximately perpendicular to the first array of discontinuous fibers to create a second array of discontinuous fibers in parallel positions having a circular periphery, each fiber being drawn a sufficient distance to intersect an initial point and a terminal point along the circular perimeter of the support platform;

d) cutting the fibers at the points of intersection along the circular perimeter of the support platform while maintaining the parallel positions of the second array of discontinuous fibers;

e) adhering the first array of discontinuous fibers to the second array of discontinuous fibers to form a reinforcement disc comprising a uniform non-woven fiber array having a circular periphery;

f) removing the reinforcement disc from the plurality of support means and the support platform;

g) adding at least one layer of a mixture of abrasive grain and organic bond components to at least one reinforcement disc to form a uniform laminate;

h) molding the uniform laminate under pressure to form a non-woven fiber reinforced thin abrasive wheel; and i) curing the non-woven fiber reinforced thin abrasive wheel.

2. The method of claim 1 further comprising the step of applying a resin coating to the fibers prior to drawing the fibers.

3. The method of claim 2 further comprising the step of heating the resin coating on the fibers to adhere the first array of discontinuous fibers to the second array of discontinuous fibers.

4. The method of claim 3 further comprising the step of applying pressure to the fibers to adhere the first array of discontinuous fibers to the second array of discontinuous fibers.

5. The method of claim 1 further comprising the step of rotating the first array of discontinuous fibers on the support platform to a position approximately 90 degrees from an initial position prior to drawing the second set of fibers.

* * * * *